March 4, 1958 G. E. RINDONE 2,825,634
GLASS ARTICLES, COMPOSITIONS AND METHODS OF PRODUCING SAME
Filed May 18, 1953 2 Sheets-Sheet 1

INVENTOR.
GUY RINDONE
BY
Oscar L. Spencer
ATTORNEY

March 4, 1958     G. E. RINDONE     2,825,634
GLASS ARTICLES, COMPOSITIONS AND METHODS OF PRODUCING SAME
Filed May 18, 1953     2 Sheets-Sheet 2

INVENTOR.
GUY RINDONE
BY
Oscar L. Spencer
ATTORNEY

United States Patent Office 2,825,634
Patented Mar. 4, 1958

2,825,634

GLASS ARTICLES, COMPOSITIONS AND
METHODS OF PRODUCING SAME

Guy E. Rindone, State College, Pa., assignor to Pittsburgh
Plate Glass Company, a corporation of Pennsylvania Application May 18, 1953, Serial No. 355,829

24 Claims. (Cl. 41—41)

This invention relates to glass articles and methods of producing same.

It is an object of the present invention to provide an electroconductive article and novel methods of producing same.

Another object of the present invention is to provide novel methods of forming printed circuits upon a base containing silver.

A still further object of the present invention is to provide novel methods of producing a silver surface on a base of glass, ceramic, metal or other material wherein the object produced is suitable for use as a mirror.

It is another object of the present invention to provide a decorative glass article having a predetermined pattern and various novel methods of producing such a pattern.

Still another object of the present invention is to provide novel methods of forming laminated articles having a surface lamination characteristic of one or more of the articles recited in the objects above.

These and other objects of the present invention will become apparent upon study of the following specification in conjunction with the accompanying drawings.

It has been discovered that certain glass compositions containing silver in the form of $Ag_2O$ when exposed to various forms of radiant energy in the presence of water vapor produce a film of silver on the exposed surface of the glass. Various methods are hereinafter disclosed for controlling the rate at which this reaction takes place. By virtue of controlling this reaction, various practical applications are made of the foregoing phenomenon, such as those recited in the foregoing objects of the present invention.

Various theories have been advanced to explain the mechanism by which this film is formed. One is that silver ions within the silver glass composition migrate to the glass surface where they are reduced to atoms by the action of radiant energy. Another explanation advanced is that silver present in the atomic state within the glass migrates to the surface to form a silver film.

Referring to the drawings.

Figure 1:
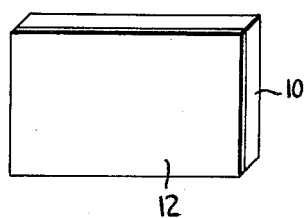
Figure 1 represents an isometric view of a glass base provided with a surface coating of silver made in accordance with the teachings of the present invention.

Referring to the drawings, which depict various typical embodiments of the present invention, Figure 1 represents an article that is suitable for use either as a mirror or as an electroconductive article having a base 10 and superimposed thereon a silver film 12. Base 10 is composed of a glass having a composition that falls within the following ranges of ingredients:

| | Percent by weight |
|---|---|
| $Ag_2O$ | 5 to 60 |
| $B_2O_3$ | 30 to 85 |
| $SiO_2$ | 0 to 60 |
| $Al_2O_3$ | 0 to 20 |

The silver film 12 is formed on a surface of the glass base 10 having a composition within the ranges cited above by exposure of the glass base in the presence of water vapor to radiant energy in the form of light or heat. Water vapor is necessary for the film formation. While visible light is effective in producing the film, shorter wavelengths in the ultraviolet region produce the film much more rapidly. The silver film may be formed in the dark in the presence of water vapor but usually requires a period of several months as compared to a small fraction of an hour when the glass is exposed to ultraviolet or visible radiation.

Film formation occurs under a variety of conditions, but, under all conditions, water vapor must be present. Even the small amount of water vapor in a calcium chloride desiccator causes film formation, but the rate of formation is more rapid at higher humidities. The silver content in the glass determines the rate of film formation, also. In addition, light or heat accelerates the reaction but the silver film forms even if the glass is kept in darkness at room temperature. However, in the dark, the formation of a film of sufficient thickness to conduct electricity requires several months. Table I shows the change in electrical resistance of the surface of a sample kept in the dark in the presence of water vapor.

TABLE I

Growth of a silver film at the surface of a silver-borate glass in the presence of water vapor and in the dark

| Time in Months | Surface Resistance (ohms/square) | Appearance |
|---|---|---|
| 0 | $4.8 \times 10^7$ | brown, no metallic luster. |
| 1 | $4.8 \times 10^7$ | Do. |
| 2 | $4.8 \times 10^7$ | Do. |
| 3 | $4.8 \times 10^7$ | faint metallic gloss. |
| 3.5 | $4.8 \times 10^7$ | increased gloss. |
| 4 | $3.6 \times 10^7$ | mirror-like silvery luster. |
| 5 | $3.6 \times 10^7$ | highly reflecting silver mirror. |
| 5.5 | $2.4 \times 10^4$ | Do. |
| 6.5 | $7.2 \times 10^2$ | Do. |
| 8 | $4.8 \times 10^2$ | Do. |

When exposed to ordinary daylight under the same conditions, silver borate glasses become coated with a mirror-like film in two or three days. Films form in a few minutes by irradiating the glass with long wave ultraviolet light (3650 A.), with the light from an unfiltered mercury vapor lamp (type $CH_4$) or with the light from a carbon arc. In all cases water vapor is necessary. Table II shows the progress of film formation of a sample irradiated by an unfiltered mercury vapor lamp at a distance of ten inches.

TABLE II

*Film formation under irradiation by unfiltered mercury vapor light in the presence of water vapor*

| Exposure | Appearance | Surface (Ohms/ Square) Resistance |
| --- | --- | --- |
| 5 minutes | black surface | above 500 megohms |
| 15 minutes | shiny black | 67 megohms |
| 30 minutes | slight silvery | 53 megohms |
| 1 hour | bright silvery mirror | 37 megohms |
| 6 hours | thick silver film | 40 ohms |
| 8 hours | silvery white | 2.7 ohms |

The film formed is originally a non-conductor because of its extreme thinness, despite its silvery appearance. As the process continues, the film becomes thicker and becomes a conductor. Under the proper conditions, therefore, films of varying electrical resistance are produced by exposing different portions of the silver containing glass to different radiation treatments.

Figure 2:
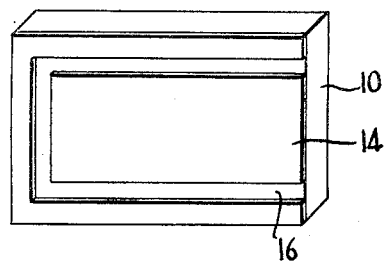
Figure 2 is a view similar to Figure 1 showing a glass base that has been partially masked to provide thereon an electroconductive film or circuit having a desired configuration.
Figure 3:
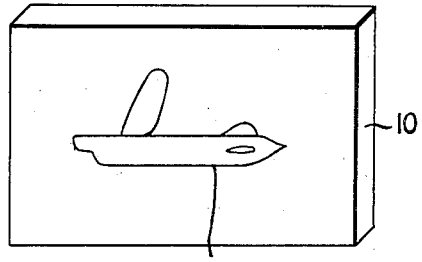
Figure 3 is a view similar to Figure 1 showing an article formed from a glass base provided with a coating of silver having a desired configuration.

Figures 2 and 3 disclose two different embodiments of a glass base provided with electroconductive coatings that are non-uniform. Figure 2 represents a glass base during the formation on its surface of a printed circuit which is formed by masking certain areas of the glass base 10 with a masking material 14 which is impervious to radiant energy or excludes water vapor from the surface, such as metal foil, black or opaque paper, Scotch tape, photographic slides or negatives, collodion, drifilm, silicone coatings, etc., for example, and exposing the glass base 10 so masked to radiant energy in the form of either heat or light in the presence of water vapor to form an electroconductive coating 16 of the desired configuration.

In Figure 3 a glass base 10 is provided with a silver film 18 having a varying thickness in the form of a pattern to form either a decorative article or an electroconductive article having a desired pattern of surface conductivity. This pattern may be formed by exposing the portions desired to be most heavily silvered and masking the balance of the surface to be exposed for a certain period, and then gradually exposing additional areas for which a lesser thickness is desired for periods commensurate with the amount of thickness desired for those areas, etc. It is important that all exposures be made in the presence of water vapor.

Figure 4:
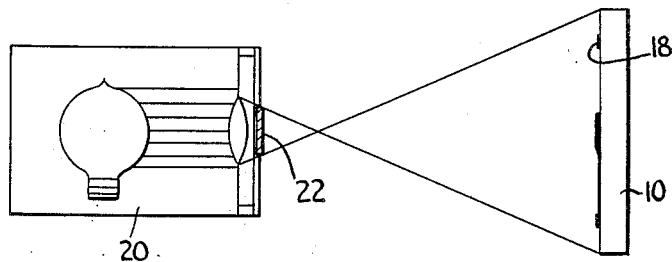
Figure 4 shows a preferred method of applying a silver coating having a desired configuration to a silver glass base in accordance with the teachings of the present invention.

The article of Figure 3 may be obtained with greater facility than the aforementioned method by the method depicted generally in Figure 4. In this latter method, a glass base 10 having the desired composition disclosed above is provided with a patterned surface 18 by utilizing the glass base 10 as a screen for the projection of an image from a photographic projector 20 which projects a print or photographic negative 22 upon a surface of the glass base 10, thereby providing a pattern having an intensity configuration that conforms to that of the negative 22 by virtue of the simultaneous exposure of the entire surface of the glass base 10 to varying intensities of illumination.

Figure 5:
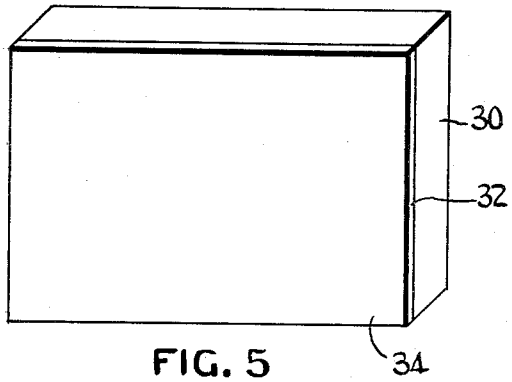
Figure 5 is a view similar to that of Figure 2 showing a laminated article made in accordance with the teachings of the present invention.
Figure 6:
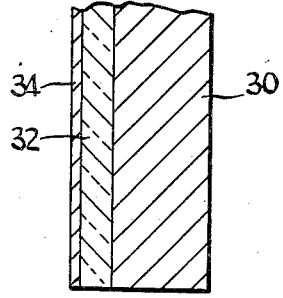
Figure 6 is a cross-sectional view of a portion of the device shown in Figure 5.

Thus far, the description of practical embodiments of the present invention has been limited to devices utilizing a base of a silver containing glass composition wherein a surface of the base is changed to a silver film having desired optical or electrical characteristics by means of certain specified treatment of the base in the presence of water vapor. However, the base itself need not be constructed of a silver glass composition necessarily. Instead, as shown in Figures 5 and 6, the finished article may comprise a base 30, which may be of a material such as glass other than a silver containing glass, a ceramic, a metal, or any other material capable of withstanding a temperature up to about 600° C. Superimposed upon the base 30 is a frit 32 composed of a silver glass composition of the type recited earlier in the specification. The exposed surface of the frit 32 may be treated in the various manners described herein-above for a silver glass base to provide front surface mirrors, electroconductive articles or printed circuits, and decorative articles similar to those described above.

Upon completion of a finished article such as shown in Figures 2, 3 or 5, a water vapor impervious film should be applied to insure that the desired film configuration is maintained. The water impervious film may be applied directly to the surface or the surface may be protected by placing the article in a moisture free container having dry air or any other dry gas which is inert to the surface, or by sealing the finished article in a vacuum.

Figure 7:
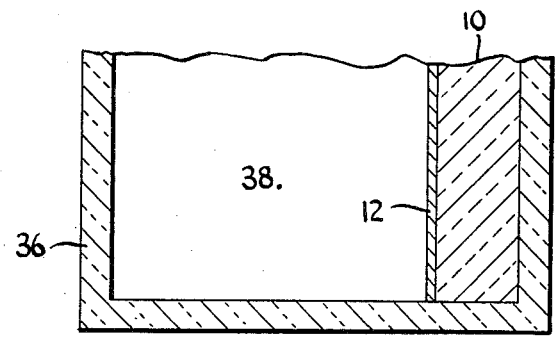
Figure 7 is a cross-sectional view of a portion of an article made in accordance with the teachings of the present invention wherein the article is encased.

In Fig. 7 a cross-sectional view of a portion of an article protected by the latter method is shown. In this figure a base 10 provided with a silver coating 12 is placed within a glass or plastic casing 36 which is filled with either dry air or a dry inert gas 38. In lieu of the inert gas, the chamber may be completely evacuated.

Another practical article that can be produced utilizing the teachings of the present invention is a device which is suitable for use as a time or vapor fuse. In such a device, either an unfilmed silver glass base or a base provided with an unfilmed silver glass frit is placed in a chamber containing water vapor.

Figure 8:
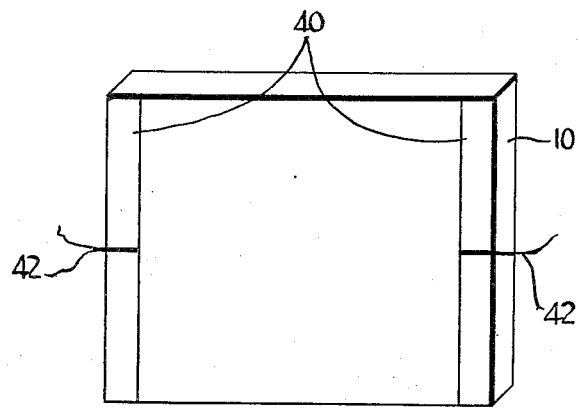
Figure 8 is an isometric view of still another embodiment of the present invention.

As shown in Figure 8, a base of silver glass 10 is provided with a pair of spaced electrodes 40 provided with leads 42 leading to an electrical circuit which may be provided with a warning device or detonator, etc. (not shown). In such a device the unprotected surface of silver glass is utilized to form an electrically conductive silver film which completes an electrical circuit after a desired time interval from the first exposure of the device to water vapor. Various practical uses of such a device include a warning signal, a detonator for fuses and explosives, a time delay switch, etc.

The following examples of compositions and procedures for film formation were demonstrated by experiment:

COMPOSITIONS

|  | No. 1 | No. 2, percent | No. 3, percent |
| --- | --- | --- | --- |
| $Ag_2O$—60% by weight | | 50 | 20 |
| $B_2O_3$—35% | | 45 | 55 |
| $SiO_2$—5% | | 5 | 10 |
| $Al_2O_3$ | | | 15 |

Example I

In the presence of air saturated with water vapor and exposed to an unfiltered mercury vapor lamp (Type $CH_4$) at a distance of 6 inches, the following typical exposures produced silver films on the above glasses:

EXPOSURE TIME

|  | Slight Black Film, minutes | Silver Mirror Film | Silver White Film, hours |
| --- | --- | --- | --- |
| Glass No. 1 | 5 | 30 minutes | 2 |
| Glass No. 2 | 5 | 1 hour | 6 |
| Glass No. 3 | 15 | 3 hours | 24 |

While the mercury vapor lamp at this distance produced considerable heat in the sample, the heat is not necessary for film formation. The film formed even when the heat from the lamp was filtered away by a layer of water placed between the lamp and the sample. At reduced temperatures, film formation required additional exposure time.

The aforementioned experiments demonstrated that the ease of film formation increases with the $Ag_2O$ content of the glass base. However, with higher percentages of $Ag_2O$, the glasses become colored from yellow to brown. This characteristic is immaterial in the formation of an electroconductive article or a silvered front surface mirror where transparency of the base is not a desired feature.

Example II

The need for water vapor for film formation is demonstrated by the following example:

Representative samples of silver glasses of varying compositions were sealed in evacuated Pyrex glass tubes. One set was irradiated with sunlight, one was kept in total darkness, one was irradiated with long wave ultraviolet, and another exposed to the unfiltered light from a mercury vapor lamp. After two months exposure to the sun, no film had formed at the surface of the samples although some of the less colored glasses showed a slight deepening of their colors. Similarly after two months irradiation by long wave ultraviolet or by the light of an unfiltered mercury vapor lamp no film had formed at the glass surfaces. Some darkening was evident, however, and to a greater degree than in the samples exposed to the sunlight. No film formation nor darkening of the color occurred in those samples kept in total darkness for eighteen months.

Another series of silver glasses were treated as described above. However, this time the sealed Pyrex glass tubes contained air saturated with water vapor. The samples exposed to sunlight showed a darkening at the surface in six hours. Film formation was clearly evident in forty-eight hours. When irradiated with long wave ultraviolet light, darkening at the surface was visible in five minutes and film formation was evident in one hour or less. Even shorter exposures with unfiltered mercury vapor light produced a silver film. Film formation was slowest in the samples kept in total darkness. In a few days the surfaces of the latter samples turned darker in color and in one week the silver film was clearly apparent.

Example III

A sample of silver containing glass was placed in a water saturated atmosphere contained in a Pyrex tube and the contents were heated to 140° C. The glass sample darkened in 5 minutes. In ten minutes a thick silver film had formed. Other samples were maintained in the ordinary dry atmosphere of an oven for periods up to eight days at temperatures up to 350° C. These latter samples showed no film formation.

Example IV

Attempts were made to produce a bright metallic film by hydrogen reduction under the following testing conditions. At room temperature a silver glass specimen was exposed to hydrogen for two hours. The hydrogen did not change the color nor produce a film by the end of this period. Additional samples were exposed to hydrogen at 300° C. These samples turned dull black in 30 minutes but the electrical resistance of the blackened surfaces remained high. At this temperature, the silver films formed are not stable and recrystallize into large aggregates of silver crystals.

Silver glasses containing less than 40% $Ag_2O$ can be obtained in a colorless, non-fluorescent condition by melting the batch under an oxygen atmosphere. All the silver in these glasses is present as $Ag^+$ ions. The presence of $Ag^0$ atoms are detected by their fluorescence and aggregated silver atoms $(Ag^0)_x$ impart a color to the glass. Silver films form on this glass both in darkness and when irradiated, if water vapor is present.

While certain specific embodiments have been described for purposes of illustration, the scope of the present invention is not to be limited thereto, but only to the scope of the accompanying claims.

What is claimed is:

1. A method of providing a glass containing 5 to 60% by weight $Ag_2O$ with a conductive coating comprising subjecting the glass to water vapor while the glass is being exposed to radiant energy for a sufficient length of time to form a film of silver on the glass surface.

2. The method described in claim 1 wherein the glass described therein has a composition included within the following ranges: 5 to 60% by weight of $Ag_2O$, 30 to 85% $B_2O_3$, 0 to 60% $SiO_2$ and 0 to 20% $Al_2O_3$.

3. The method described in claim 1 wherein the conductive coating so formed is subsequently protected by means of a water-impervious coating.

4. The method described in claim 3 wherein the water-impervious coating is applied directly onto the surface containing the conductive coating.

5. The method described in claim 1 wherein the glass with the silver film thereon is protected by encasing it within a chamber free of water vapor.

6. A method of forming a conductive coating of a desired configuration on the surface of a sheet of a glass containing 5 to 60% by weight $Ag_2O$ comprising masking a portion of the surface of a glass plate, subjecting the glass plate so masked to water vapor while the glass is being exposed to radiant energy for a sufficient length of time to form a silver film on the unmasked portion of the surface of the glass and protecting the surface from additional exposure to water vapor.

7. A method of forming a conductive article having highly conductive regions and highly resistant regions from a glass containing 5 to 60% by weight $Ag_2O$ comprising masking the regions desired to be rendered highly resistant, subjecting the article so masked to water vapor while the article is being exposed to radiant energy for a sufficient length of time to form a conductive film on the unmasked surface of the glass, and protecting the article thus formed from additional exposure to water vapor.

8. The method of providing a glass base containing 5 to 60% by weight $Ag_2O$ with a silver film thereon comprising subjecting said base to water vapor while it is being exposed to radiant energy for a sufficient length of time to form a silver film on the glass base and subsequently protecting the coated glass base from additional exposure to water vapor.

9. A method of providing a base coated with a glass frit containing 5 to 60% by weight $Ag_2O$ with an electroconductive coating having a desired configuration comprising subjecting the glass frit to water vapor, simultaneously exposing a surface of said glass frit to a pattern of radiant energy having the configuration desired for the conductive coating for a sufficient length of time to form the coating on the exposed surface and subsequently protecting the coated frit from further exposure to water vapor.

10. A method of forming a printed electrical conducting circuit on a ceramic base having a composition which includes 5 to 60% by weight $Ag_2O$ which comprises projecting a source of light through a photographic slide having a transmission configuration that is a function of the configuration desired for the printed circuit upon a surface of said ceramic base while the base is subjected to water vapor for a sufficient length of time to form a silver film on the portions of the base exposed to the light and water vapor and subsequently protecting the coated ceramic base from further exposure to water vapor.

11. A method of forming a pattern on a surface of a glass having a composition which includes 5 to 60% by weight $Ag_2O$ which comprises subjecting the glass to water vapor while projecting light from a source of illumination onto a surface of said base through a partially transparent member having a pattern of the desired configuration for a length of time sufficient to form a silver film in the desired pattern on the surface exposed to water vapor and light, removing the source of illumination, and protecting the coated glass from further exposure to water vapor.

12. A method of forming a silver film on a ceramic base comprising subjecting a surface of a ceramic base containing 5 to 60% by weight $Ag_2O$ to water vapor while exposing the surface to radiant energy for a sufficient length of time to form a silver film on the exposed surface.

13. An article comprising a ceramic base having the composition comprising 5 to 60% by weight of $Ag_2O$, 30 to 85% $B_2O_3$, 0 to 60% $SiO_2$, and 0 to 20% $Al_2O_3$ and a thin film of silver on a surface thereof.

14. A printed electrical circuit comprising a ceramic base having a composition comprising 5 to 60% by weight of $Ag_2O$, 30 to 85% $B_2O_3$, 0 to 60% $SiO_2$, and 0 to 20% $Al_2O_3$ provided with a silver film in the configuration desired for the electrical circuit at a surface thereof.

15. A method of forming a pattern on a glass surface having a composition which includes 5 to 60% by weight $Ag_2O$ which comprises subjecting the surface to water vapor while selectively exposing the various portions of the surface to different predetermined amounts of radiant energy for a sufficient length of time to form a patterned, silver film on the glass surface, and thereafter protecting the patterned, glass article from additional exposure to water vapor.

16. The method described in claim 15 wherein the glass has a composition comprising 5 to 60% by weight of $Ag_2O$, 30 to 85% of $B_2O_3$, 0 to 60% of $SiO_2$ and 0 to 20% of $Al_2O_3$.

17. An article of manufacture comprising a base of a material capable of withstanding temperatures upward of 600° C., and a glass coating having a composition consisting essentially of 5 to 60% by weight of $Ag_2O$, 30 to 85% $B_2O_3$, up to 60% $SiO_2$, and up to 20% $Al_2O_3$ superimposed upon said base.

18. The article recited in claim 17 wherein a thin film of silver is present on the exposed surface of said glass.

19. A glass consisting essentially of 5 to 60% by weight of $Ag_2O$, 30 to 85% of $B_2O_3$, up to 60% of $SiO_2$ and 0 to 20% of $Al_2O_3$.

20. A method of providing a glass containing at least 5% by weight $Ag_2O$ with a conductive coating which comprises subjecting the glass to water vapor while the glass is being exposed to radiant energy for a sufficient length of time to produce a conductive coating on the surface of the glass.

21. A method of forming a conductive coating of a desired configuration on the surface of glass containing 5 to 60% by weight silver oxide which comprises selectively subjecting a portion of the surface of the glass to water vapor while said portion is being exposed to radiant energy for a sufficient length of time to form a conductive silver coating thereon and protecting the coated glass from additional exposure to water vapor.

22. The method described in claim 21 wherein the glass contains at least 5% by weight $Ag_2O$.

23. The method described in claim 21 wherein the glass contains 5 to 60% by weight $Ag_2O$, 30 to 85% by weight $B_2O_3$, 0 to 60% by weight $SiO_2$, and 0 to 20% by weight $Al_2O_3$.

24. The method described in claim 2 wherein the coated glass is subsequently protected by means of a water impervious coating.

References Cited in the file of this patent

UNITED STATES PATENTS

| | | |
|---|---|---|
| 572,095 | Atkins | Dec. 1, 1896 |
| 1,884,665 | Greiner | Oct. 25, 1932 |
| 2,281,076 | Nash | Apr. 28, 1942 |
| 2,314,804 | Willson | Mar. 23, 1943 |
| 2,515,940 | Stookey | July 18, 1950 |
| 2,515,943 | Stookey | July 18, 1950 |
| 2,628,160 | Stookey | Feb. 10, 1953 |
| 2,647,068 | Patai | July 28, 1953 |

OTHER REFERENCES

Handbook of Chem. and Physics, 22nd ed., pub. 1937, Chemical Rubber Pub. Co., Cleveland, Ohio, No. 20, p. 444.